(12) United States Patent
Okabe

(10) Patent No.: US 12,240,548 B2
(45) Date of Patent: Mar. 4, 2025

(54) TWO-SEATER OFF-ROAD VEHICLE

(71) Applicant: Kubota Corporation, Osaka (JP)

(72) Inventor: Kensuke Okabe, Sakai (JP)

(73) Assignee: Kubota Corporation, Osaka (JP)

( * ) Notice: Subject to any disclaimer, the term of this patent is extended or adjusted under 35 U.S.C. 154(b) by 664 days.

(21) Appl. No.: 17/518,025

(22) Filed: Nov. 3, 2021

(65) Prior Publication Data

US 2022/0371674 A1 Nov. 24, 2022

(30) Foreign Application Priority Data

May 19, 2021 (JP) .................................. 2021-084771

(51) Int. Cl.

| | |
|---|---|
| *B60K 17/344* | (2006.01) |
| *B62D 63/04* | (2006.01) |
| *B62J 1/14* | (2006.01) |
| *B62J 7/02* | (2006.01) |
| *B62J 25/00* | (2020.01) |
| *B62M 7/04* | (2006.01) |
| *B62M 9/04* | (2006.01) |

(52) U.S. Cl.
CPC ............ *B62D 63/04* (2013.01); *B60K 17/344* (2013.01); *B62J 1/14* (2013.01); *B62J 7/02* (2013.01); *B62J 25/00* (2013.01); *B62M 7/04* (2013.01); *B62M 9/04* (2013.01)

(58) Field of Classification Search
CPC ...... B60K 17/24; B60K 17/34; B60K 17/344; B60Y 2200/124; B60Y 2200/23; B60Y 2304/01; B62D 21/183; B62D 63/04; B62J 1/14; B62J 7/02; B62J 25/00; B62M 7/04; B62M 9/04
USPC ......................................................... 180/233
See application file for complete search history.

(56) References Cited

U.S. PATENT DOCUMENTS

| | | | |
|---|---|---|---|
| 9,217,501 B2 | 12/2015 | Deckard et al. | |
| 2013/0175779 A1 | 7/2013 | Kvien et al. | |
| 2017/0136874 A1* | 5/2017 | Harris ................... | B60G 3/185 |

FOREIGN PATENT DOCUMENTS

JP       2004067079 A  *  6/2004  ............ B60J 5/0487

* cited by examiner

*Primary Examiner* — Kevin Hurley
*Assistant Examiner* — Felicia L. Brittman-Alabi
(74) *Attorney, Agent, or Firm* — The Webb Law Firm

(57) ABSTRACT

A two-seater off-road vehicle includes a travel vehicle body that is supported on the ground by a front wheel unit and a rear wheel unit, and a boarding part disposed above a vehicle body frame included in the travel vehicle body. The boarding part includes: a driver seat; a steering operation tool in front of the driver seat; and a passenger seat of a saddle seat type behind the driver seat.

5 Claims, 4 Drawing Sheets ically used in forest driving sports and so on because it can travel through a narrow space between trees that a side-by-side vehicle cannot pass through. However, in driving sports or work driving, a driver and an assistant (a passenger) are often on board.
TWO-SEATER OFF-ROAD VEHICLE

CROSS-REFERENCE TO RELATED APPLICATIONS

This application claims priority to Japanese Patent Application No. 2021-084771 filed May 19, 2021, the disclosure of which is hereby incorporated by reference in its entirety.

BACKGROUND OF THE INVENTION

1. Field of the Invention

The present invention relates to a two-seater off-road vehicle in which a driver and a passenger can be on board.

2. Description of the Related Art

As a compact off-road vehicle, a two-seater off-road vehicle, called a side-by-side vehicle, is disclosed in U.S. Pat. No. 9,217,501B (Patent Document 1). Two-seater off-road vehicles are used not only for traveling purpose for hunting or agriculture but also for driving sports. As an off-road vehicle that is more compact than a two-seater off-road vehicle, a single-seater off-road vehicle is disclosed in US 2013/0175779A (Patent Document 2).

[Patent Document 1] U.S. Pat. No. 9,217,501B
[Patent Document 2] US 2013/0175779A

SUMMARY OF THE INVENTION

The width of the single-seater off-road vehicle disclosed in Patent Document 2 is small, and thus the single-seater off-road vehicle is advantageously used in forest driving sports and so on because it can travel through a narrow space between trees that a side-by-side vehicle cannot pass through. However, in driving sports or work driving, a driver and an assistant (a passenger) are often on board.

Therefore, there is a demand for an off-road vehicle in which two person can be on board and whose width is as large as that of a single-seater off-road vehicle.

According to the present invention, a two-seater off-road vehicle includes: a travel vehicle body that is supported on the ground by a front wheel unit and a rear wheel unit; a vehicle body frame included in the travel vehicle body; and a boarding part disposed above the vehicle body frame and including: a driver seat; a steering operation tool in front of the driver seat; and a passenger seat of a saddle seat type behind the driver seat.

With this configuration, the driver seat and the passenger seat, which serve as two seats for two people, are aligned and arranged in the longitudinal direction of the vehicle body, and thus the width of this two-seater off-road vehicle is substantially as large as the width of one-seater off-road vehicle. Furthermore, a saddle seat is employed as the passenger seat, and thus the distance between the driver seat and the passenger seat can be shortened. Accordingly, the two-seater off-road vehicle of the present invention has a shorter vehicle body length and a shorter wheel base than those of a conventional off-road vehicle including a front seat and a rear seat. Due to such characteristics, the two-seater off-road vehicle of the present invention can easily travel through a narrow street or through a narrow space between trees, and due to a small wheel base, a turning radius is reduced and the ramp break over angle is increased, resulting in an improvement in the traveling performance for rough roads. Note here that the passenger seat means a seat for a passenger other than the driver, and does not mean a seat dedicated for an assistant who directly helps driving.

When a passenger is to be seated on the passenger seat, the passenger opens his or her legs and is seated so as to hold the driver seat by the legs, and puts the legs on the sides of the driver seat. With this, the passenger seat can be located close to the rear end of the driver seat. That is to say, there is hardly a gap between the driver seat and the passenger seat, and thus it is advantageous that only a small space is required for accommodating the driver seat and the passenger seat in the longitudinal direction of the vehicle body. Therefore, according to a preferred embodiment of the present invention, the two-seater off-road vehicle further includes a driver footrest panel as a floor panel which driver footrest panel is in front of the driver seat; and passenger footrest panels as floor panels which passenger footrest panels are on opposite lateral sides of the driver seat.

An off-road vehicle is provided with a luggage carrier, but if there is a luggage that cannot be stored in the luggage carrier, the luggage will be placed on a seat. Even in the case of a two-seater off-road vehicle, when the passenger seat is not used, the passenger seat will serve as a luggage storage place, but if the passenger seat is a saddle seat, the luggage loading area is small and it is difficult to stably place the luggage. Accordingly, it is advantageous if a space created by folding away the passenger seat that is not used can be used as a luggage storage place. Therefore, according to a preferred embodiment of the present invention, the two-seater off-road vehicle further includes a luggage carrier disposed behind the boarding part and extendable forward into a space created by folding away the passenger seat.

According to a preferred embodiment of the present invention, the two-seater off-road vehicle further includes a power train in a space that extends from below the passenger seat to the rear wheel unit. With this configuration, it is possible to make efficient use of a space below the passenger seat, which is likely to be a dead space.

According to a preferred embodiment of the present invention, the power train includes: an engine including an engine output shaft extending in a longitudinal direction of the vehicle body; a rear transmission coupled to a rear portion of the engine; and a continuously variable transmission coupled to a rear portion of the rear transmission, and the power train is fixed to the vehicle body frame. With this configuration, downsizing is realized as a result of the engine, the rear transmission, and the continuously variable transmission being coupled in series to each other and being constructed as one piece. Furthermore, since the engine output shaft extends in the longitudinal direction of the vehicle body, there is no need of providing a bevel gear or the like for connection to a PTO (Power Take Off) shaft for transmitting an engine output to an external device, resulting in simplification of a PTO configuration.

The mainstream type of off-road vehicles is a four-wheel drive type. Therefore, any engine, regardless of whether it is a front engine or a rear engine, requires a propeller shaft that extends in the longitudinal direction of the vehicle body and transmits engine power to the front wheel unit or the rear wheel unit. In order to avoid situations in which, due to the presence of the propeller shaft, the height of a floor panel serving as a footrest from the ground is large, and the propeller shaft interferes with another vehicle device, the height of the propeller shaft from the ground is preferably small. However, if the propeller shaft is exposed to the ground from the vehicle body frame below the vehicle body, the propeller shaft may directly collide with an obstacle placed on the ground surface and may be damaged. In order to solve such a problem, according to a preferred embodiment of the present invention, the two-seater off-road vehicle further includes: a front transmission configured to transmit power to the front wheel unit via a front axle; and a propeller shaft that extends in the longitudinal direction of the vehicle body at a height from the ground at which height a lower frame is disposed which lower frame corresponds to a lower layer of the vehicle body frame and that is configured to transmit power of the engine from the rear transmission to the front transmission.

DETAILED DESCRIPTION OF PREFERRED EMBODIMENTS

Figure 1:
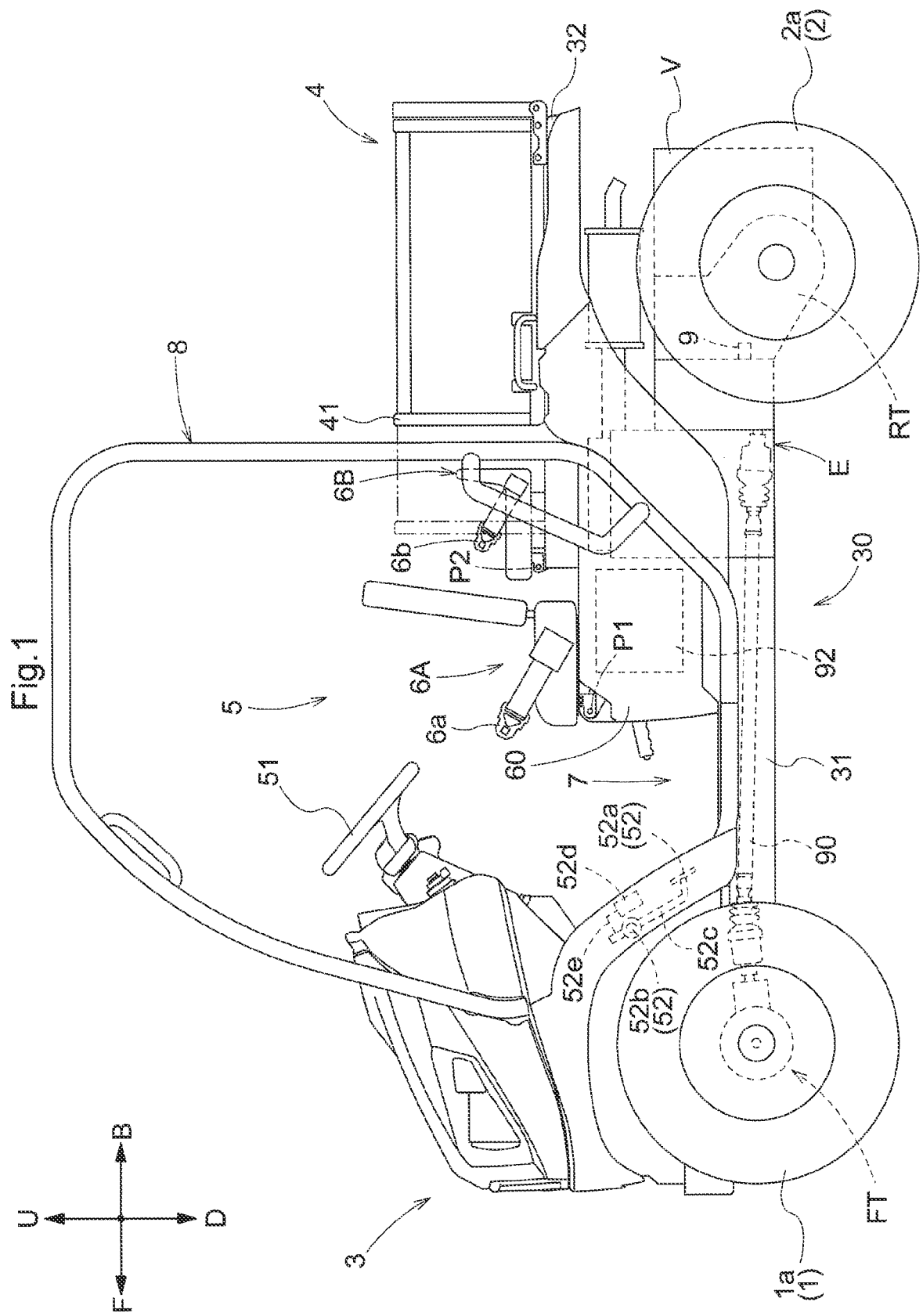
FIG. 1 is a side view illustrating a two-seater off-road vehicle.
Figure 2:
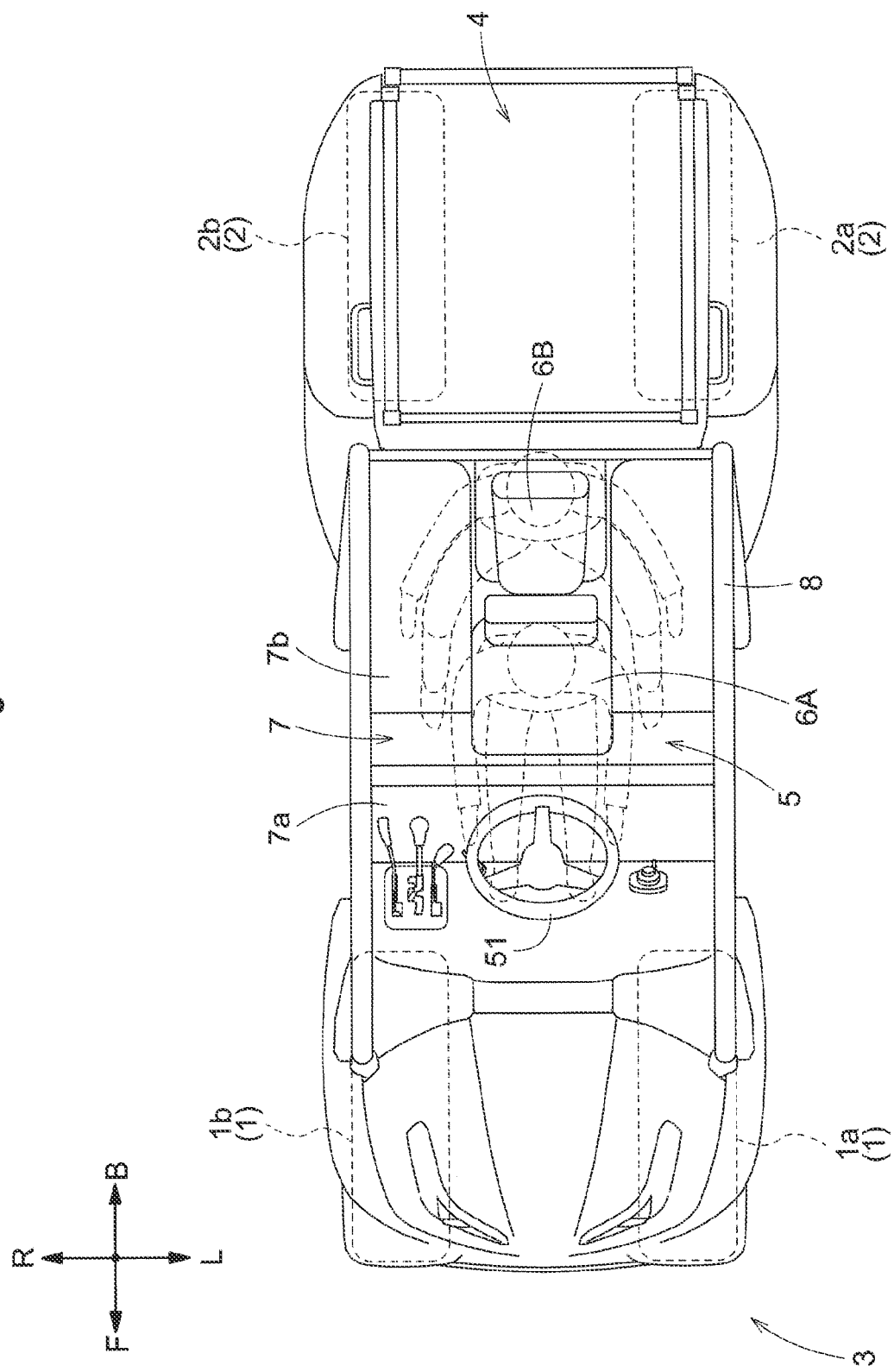
FIG. 2 is a plane view illustrating the two-seater off-road vehicle.
Figure 3:
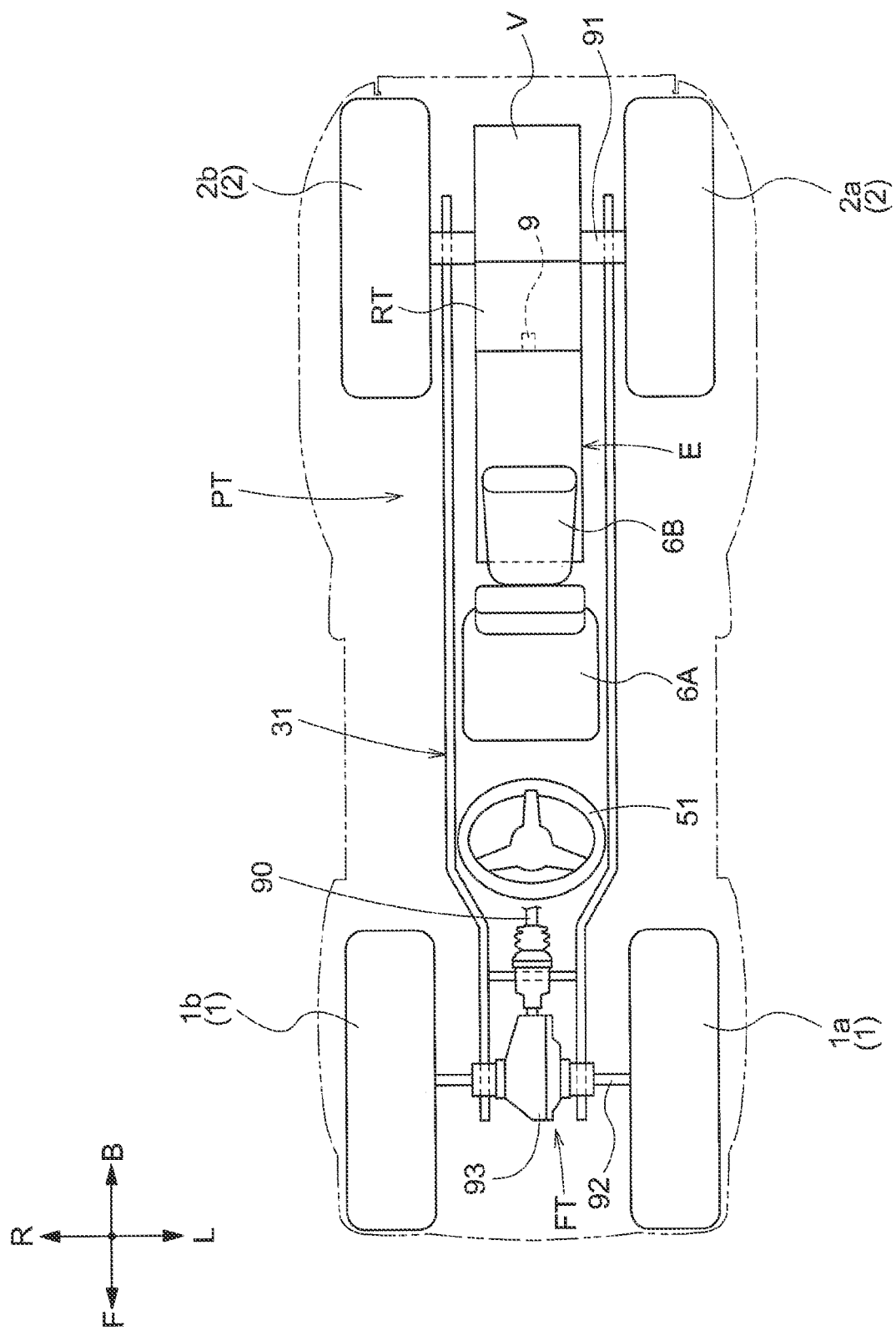
FIG. 3 is a plane view schematically illustrating a layout of seats and a power train in the two-seater off-road vehicle.

Hereinafter, an embodiment of a two-seater off-road vehicle according to the present invention will be described. FIG. 1 is a side view of the two-seater off-road vehicle, and FIG. 2 is a plane view of the two-seater off-road vehicle. Note that, in the following description, with respect to the two-seater off-road vehicle, the direction of an arrow F shown in FIGS. 1, 2, and 3 is defined as "forward of the vehicle body", and the direction of an arrow B is defined as "rearward of the vehicle body" (longitudinal direction of the vehicle body), and the direction of an arrow U shown in FIG. 1 is defined as "upward of the vehicle body", and the direction of an arrow D is defined as "downward of the vehicle body" (vertical direction of the vehicle body). Furthermore, the direction of an arrow L shown in FIGS. 2 and 3 is defined as "leftward of the vehicle body", and the direction of an arrow R is defined as "rightward of the vehicle body" (transverse direction of the vehicle body).

The two-seater off-road vehicle is provided with a travel vehicle body 3 that is supported on the ground by a front wheel unit 1 including a left front wheel 1*a* and a right front wheel 1*b*, and a rear wheel unit 2 including a left rear wheel 2*a* and a right rear wheel 2*b*. The front wheel unit 1 is drivable and steerable, and the rear wheel unit 2 is drivable. This two-seater off-road vehicle is configured to be switchable between a two-wheel drive state in which only the rear wheel unit 2 is driven, and a four-wheel drive state in which the front wheel unit 1 and the rear wheel unit 2 are driven.

The travel vehicle body 3 includes a vehicle body frame 30. The vehicle body frame 30 has a frame structure, and includes a lower frame 31 that constitutes the lowermost layer of the vehicle body frame 30, and a rear frame 32 that is disposed above a rear region of the lower frame 31. A boarding part 5 is formed in a central region of the travel vehicle body 3. The drive portion 5 includes a driver seat 6A and a passenger seat 6B. The boarding part 5 is surrounded by a roll cage 8 that is made of a pipe material. The roll cage 8 is also referred to as a ROPS (Roll-Over Protective Structure). A steering wheel 51, which serves as a steering operation tool, other driving operation tools, and an instrument panel are provided in front of the driver seat 6A. A luggage carrier 4 is supported by the rear frame 32.

The driver seat 6A and the passenger seat 6B are arranged in the center in the transverse direction of the vehicle body, and are aligned in the longitudinal direction of the vehicle body. This series arrangement of the driver seat 6A and the passenger seat 6B can realize a small vehicle body width of the two-seater off-road vehicle, that is, a vehicle body width of about 1 m to 1.2 m.

In this embodiment, the driver seat 6A is of a bucket seat type, and is constituted by a seat cushion and a seat back, and the passenger seat 6B is of a saddle seat type. Note that a saddle seat serving as the passenger seat 6B also has a backrest that stands upright from a rear portion of the seat surface. Seatbelts 6*a* and 6*b* are respectively attached to the driver seat 6A and the passenger seat 6B. A passenger to be seated on the passenger seat 6B straddles the passenger seat 6B, stretches his or her left leg along the left side of the driver seat 6A, and stretches his or her right leg along the right side of the driver seat 6A. Thus, since there is hardly a gap between the driver seat 6A and the passenger seat 6B, the length of the seats for two people, that is, the driver seat 6A and the passenger seat 6B, in the longitudinal direction of the vehicle body is short. This contributes to the downsizing of the travel vehicle body 3 in the longitudinal direction of the vehicle body.

The driver seat 6A and the passenger seat 6B are arranged on the upper surface of a seat pedestal 60 supported by the lower frame 31. The driver seat 6A is swingable back and forth around a first swing axis P1 that extends below the front end thereof in the transverse direction of the vehicle body, and the passenger seat 6B is swingable back and forth around a second swing axis P2 that extends below the front end thereof in the transverse direction of the vehicle body.

When the passenger seat 6B is not used, by swinging the passenger seat 6B forward around the second swing axis P2 from a horizontal position (seated position) into a vertical position (luggage loading position), the upper surface of the seat pedestal 60 that was occupied by the passenger seat 6B in the horizontal position is uncovered. The passenger seat 6B can be locked in the vertical position. In this embodiment, the luggage carrier 4 has a folding structure such that it can be extended forward. Specifically, a front wall 41 has the folding structure, and when the luggage carrier 4 is folded, the front wall 41 is folded to serve as the front end wall of the luggage carrier 4. The front wall 41 is divided into left and right portions at a central region, and has a structure such that the divided left and right wall portions of the front wall 41 are swingable in the front-rear direction around swing axes, which are provided at boundaries between the left and right wall portions and the side walls and extend in the vertical direction. When the luggage carrier 4 is extended, the folded left and right wall portions are swung forward and unfolded into a state of extending continuously from the left and right side walls, and serve as front-side portions of the left and right side walls of the luggage carrier 4. Accordingly, the space of the luggage carrier 4 is extended forward. At this time, the upper surface of the seat pedestal 60 uncovered when the passenger seat 6B was swung away is available as a bottom portion of the extended region of the luggage carrier 4.

The bottom of the boarding part 5 is constituted by a floor panel 7 attached to the lower frame 31. The floor panel 7 is made of a plate material or a mesh material, or a combination thereof. As shown in FIG. 2, the floor panel 7 includes a driver footrest panel 7*a* that is laid so as to extend from a position in front of the driver seat 6A to both left and right sides, and passenger footrest panels 7*b* that extend forward from both left and right sides of the driver seat 6A and are connected to the driver footrest panel 7a. Rear regions of the passenger footrest panels 7b also function as a platform that is used when the passenger accesses the luggage carrier 4 from the inside of the vehicle.

As shown in FIG. 1, a brake pedal 52a, which is a constituent component of a brake operation mechanism 52 for operating a not-shown braking device, is arranged below the steering wheel 51. The brake pedal 52a includes a brake arm 52c that is swung up and down around a pedal fulcrum point 52b. A footboard is provided as a lower end of the brake arm 52c. A brake master cylinder 52d is provided at an upper end of the brake arm 52c on a side opposite to the footboard with the pedal fulcrum point 52b interposed therebetween, and a link 52e that transmits a brake operation displacement is coupled to the brake master cylinder 52d. The brake master cylinder 52d, which is a constituent component of the brake operation mechanism 52, is arranged on the rear side of the pedal fulcrum point 52b in the longitudinal direction of the vehicle body, and is arranged above the footboard. Accordingly, the length of the brake operation mechanism 52 in the longitudinal direction of the vehicle body is short.

As schematically shown in FIG. 3, a power train PT is arranged in a space that extends from below the passenger seat 6B to the rear wheel unit 2. The power train PT is supported by the lower frame 31. The power train PT includes an engine E whose engine output shaft 9 extends in the longitudinal direction of the vehicle body, a continuously variable transmission V, and a rear transmission RT. In this embodiment, since the front wheel unit 1 is also configured as drive wheels, a propeller shaft 90 and a front transmission FT that transmit engine power to the front wheel unit 1 are provided as a power train PT for the front wheels.

Figure 4:
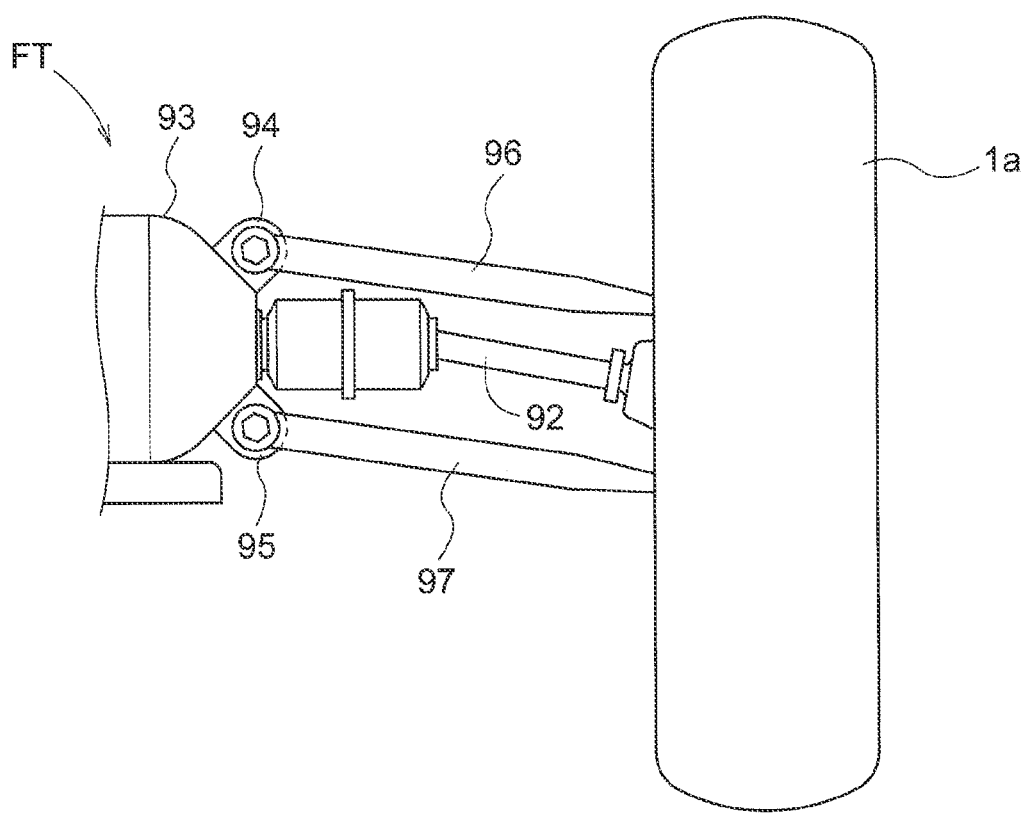
FIG. 4 is a front view illustrating a front transmission and a front left wheel.

FIG. 4 is a front view of the front transmission FT and the left front wheel 1a. To configure a front suspension, an upper bracket 94 and a lower bracket 95 are fixed to a side end portion of a housing 93 of the front transmission FT. An end of an upper link 96 is coupled to the upper bracket 94, and an end of a lower link 97 is coupled to the lower bracket 95. The other end of the upper link 96 and the other end of the lower link 97 are coupled to the left front wheel 1a. Since the front suspension is directly provided in the housing 93 of the front transmission FT, it is possible to realize a long upper link 96 and a long lower link 97 that constitute the front suspension, making it possible for a front axle 92 to have a large curvature angle. Also, forces applied to the upper link 96 and the lower link 97 are received by the rigid housing 93 of the front transmission FT, and thus there is no need of providing a specific reinforcing frame for supporting the upper link 96 and the lower link 97.

As shown in FIG. 1, the seat pedestal 60 has a hollow structure, and part of the engine E is arranged inside the seat pedestal 60. As shown in FIG. 3, the continuously variable transmission V includes an HST (Hydro-Static Transmission) for transmitting transmission power to the rear transmission RT and the front transmission FT. The rear transmission RT is coupled to the rear wheel unit 2 via a rear axle 91, and the front transmission FT is coupled to the front wheel unit 1 via the front axle 92. In the power train PT of the present embodiment, the rear transmission RT is arranged downstream the engine E, and the continuously variable transmission V is arranged downstream the rear transmission RT. That is to say, the engine E, the rear transmission RT, and the continuously variable transmission V are aligned and coupled to each other in the longitudinal direction of the vehicle body.

The propeller shaft 90 that couples the rear transmission RT and the front transmission FT so as to be able to transmit power thereto is arranged in the center in the transverse direction of the vehicle body, and extends in the longitudinal direction of the vehicle body at substantially the same height from the ground as the lower frame 31, or preferably at a position slightly higher than the lower frame 31.

OTHER EMBODIMENTS (1) In the above-described embodiment, the roll cage 8 is made of a pipe material, but may also be made partially or completely of a square material. Also, the roll cage 8 may also be partially or completely removable.

(2) Instead of the roll cage 8, a cabin that is a closed space that includes the boarding part 5 may be used. In this case, main equipment for HVAC (Heating, Ventilation, and Air Conditioning) for air conditioning inside the cabin is arranged below the driver seat 6A inside the seat pedestal 60, in order to make efficient use of the space.

(3) In the above-described embodiment, the luggage carrier 4 can be extended forward when the passenger seat 6B is not needed, but a non-extendable luggage carrier 4 may also be used. Also, if such a non-extendable luggage carrier 4 is used, the passenger seat 6B may be fixed to the seat pedestal 60, or may be swingable or detachable for an access to the inside of the seat pedestal 60.

(4) In the above-described embodiment, the rear transmission RT is arranged downstream the engine E, and the continuously variable transmission V is arranged downstream the rear transmission RT, but this arrangement may be modified. For example, the continuously variable transmission V may also be arranged downstream the engine E, and the rear transmission RT may also be arranged downstream the continuously variable transmission V. Both arrangements can contribute to a reduction in the width of the vehicle body.

(5) The two-seater off-road vehicle of the above-described embodiments is of the four-wheel drive type, and thus the propeller shaft 90 that extends below the driver seat 6A and the passenger seat 6B in the longitudinal direction of the vehicle body transmits engine power to the front wheel unit 1. If this two-seater off-road vehicle is of the two-wheel drive type, the propeller shaft 90, a front differential, and a front drive axle are not needed, and a large space is created. By making use of this space, the two-seater off-road vehicle can employ a specification of very small turning with a large steering angle.

INDUSTRIAL APPLICABILITY

The present invention is applicable to a two-seater off-road vehicle.

DESCRIPTION OF REFERENCE SIGNS

1: Front wheel unit
2: Rear wheel unit
3: Travel vehicle body
4: Luggage carrier
5: Boarding part
6A: Driver seat
6B: Passenger seat
7: Floor panel
7a: Driver footrest panel
7b: Passenger footrest panel
30: Vehicle body frame 31: Lower frame
32: Rear frame
60: Seat pedestal
9: Engine output shaft
90: Propeller shaft
91: Rear axle
92: Front axle
E: Engine
FT: Front transmission
PT: Power train
RT: Rear transmission
V: Continuously variable transmission

What is claimed is:

1. A two-seater off-road vehicle comprising:
a travel vehicle body that is supported on ground by a front wheel unit and a rear wheel unit;
a vehicle body frame included in the travel vehicle body;
a boarding part disposed above the vehicle body frame and comprising:
 a driver seat;
 a steering operation tool in front of the driver seat; and
 a saddle seat passenger seat behind the driver seat; and
a luggage carrier disposed behind the boarding part, having a front wall as a front end and left and right side walls,
wherein the passenger seat is swingable back and forth around an axis that extends below a front end of the passenger seat in a transverse direction of the travel vehicle body,
wherein the front wall can be divided into left and right portions, and the divided left and right wall portions are swingable respectively in a front-rear direction around swing axes that extend in a vertical direction about the left and right side walls to serve as front-side portions of the side walls of the luggage carrier, and
wherein the front wall swings forward to extend the luggage carrier forward into a space created by folding away the passenger seat.

2. The two-seater off-road vehicle according to claim 1, further comprising:
a driver footrest panel as a floor panel, wherein the driver footrest panel is in front of the driver seat; and
passenger footrest panels as floor panels, wherein the passenger footrest panels are on opposite lateral sides of the driver seat.

3. The two-seater off-road vehicle according to claim 1, further comprising:
a power train in a space that extends from below the passenger seat to the rear wheel unit.

4. The two-seater off-road vehicle according to claim 3, wherein the power train comprises:
an engine including an engine output shaft extending in a longitudinal direction of the vehicle body;
a rear transmission coupled to a rear portion of the engine; and
a continuously variable transmission coupled to a rear portion of the rear transmission, and
wherein the power train is fixed to the vehicle body frame.

5. The two-seater off-road vehicle according to claim 4, further comprising:
a front transmission configured to transmit power to the front wheel unit via a front axle; and
a propeller shaft that extends in the longitudinal direction of the vehicle body at a height from the ground at which height a lower frame is disposed, wherein the lower frame corresponds to a lower layer of the vehicle body frame, and wherein the propeller shaft is configured to transmit power of the engine from the rear transmission to the front transmission.

* * * * *